United States Patent
Levin et al.

(10) Patent No.: US 11,716,340 B2
(45) Date of Patent: Aug. 1, 2023

(54) THREAT DETECTION USING CLOUD RESOURCE MANAGEMENT LOGS

(71) Applicant: Microsoft Technology Licensing, LLC, Redmond, WA (US)

(72) Inventors: Roy Levin, Haifa (IL); Ram Haim Pliskin, Rishon Lezion (IL); Johnathan Samuel Simon, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 4 days.

(21) Appl. No.: 17/333,534

(22) Filed: May 28, 2021

(65) Prior Publication Data

US 2022/0385682 A1    Dec. 1, 2022

(51) Int. Cl.
  *H04L 9/40* (2022.01)
  *H04L 67/50* (2022.01)
  *H04L 67/10* (2022.01)

(52) U.S. Cl.
  CPC .......... *H04L 63/1425* (2013.01); *H04L 67/10* (2013.01); *H04L 67/535* (2022.05)

(58) Field of Classification Search
  CPC . H04L 63/14; H04L 63/1408; H04L 63/1425; H04L 67/10; H04L 67/535
  See application file for complete search history.

(56) References Cited

U.S. PATENT DOCUMENTS

| | | |
|---|---|---|
| 9,727,723 B1 | 8/2017 | Kondaveeti et al. |
| 2007/0094711 A1* | 4/2007 | Corley .................. G06F 21/554 726/3 |
| 2015/0180894 A1* | 6/2015 | Sadovsky ............. H04W 12/12 726/22 |
| 2017/0063912 A1 | 3/2017 | Muddu et al. |
| 2017/0286671 A1* | 10/2017 | Chari ..................... G06F 21/552 |
| 2018/0191760 A1* | 7/2018 | Kumar .................... H04L 67/52 |
| 2018/0375883 A1* | 12/2018 | Bhatkar ................ H04L 67/306 |
| 2020/0213338 A1 | 7/2020 | Lotem et al. |
| 2020/0285737 A1 | 9/2020 | Kraus et al. |
| 2020/0296117 A1* | 9/2020 | Karpovsky ........... G06F 21/577 |
| 2020/0358780 A1* | 11/2020 | Anbalagan ............ H04L 63/105 |
| 2021/0006595 A1* | 1/2021 | Azulay ............... H04L 67/5682 |

(Continued)

OTHER PUBLICATIONS

"International Search Report and Written Opinion Issued in PCT Application No. PCT/US22/027755", dated Aug. 1, 2022, 12 Pages.

*Primary Examiner* — Jeong S Park
(74) *Attorney, Agent, or Firm* — Schwegman Lundberg & Woessner, P.A.

(57) ABSTRACT

Generally discussed herein are devices, systems, and methods for improving cloud resource security. A method can include obtaining a cloud resource management log that details actions performed by users of cloud resources in a cloud portal, the actions including entries comprising at least two of a user identification (ID) of a user of the users, an operation of operations performed on the cloud resource, a uniform resource identifier (URI) of a cloud resource of the cloud resources that is a target of the operation, or a time the operation was performed. The method can include determining a respective score for each action in the cloud resource management log, comparing the respective score to a specified criterion, and providing an indication of anomalous action in response to determining the respective score satisfies the specified criterion.

20 Claims, 6 Drawing Sheets

(56) References Cited

U.S. PATENT DOCUMENTS

| | | | | |
|---|---|---|---|---|
| 2021/0209243 A1* | 7/2021 | Gallardo | ............... | G06F 16/188 |
| 2021/0360080 A1* | 11/2021 | Blachman | ............... | H04L 41/06 |
| 2022/0188413 A1* | 6/2022 | Singh | ................... | G06F 21/554 |

* cited by examiner

THREAT DETECTION USING CLOUD RESOURCE MANAGEMENT LOGS

BACKGROUND

Cloud resource deployment provides app developers opportunities to reach users. Cloud resource deployment provides an attacker with attack vectors that are not available in other settings. Cloud resource security can thus benefit from threat detection and prevention that is specific to cloud resource deployment and access.

SUMMARY

A method, device, or machine-readable medium for cloud resource security management can improve upon prior techniques for cloud resource security management. The method, device, or machine-readable medium can provide a view of user operations on cloud resources at an organizational level, as opposed to a user, group of users, or resource level. The organizational level considers a group of users and a corresponding group of cloud resources. The organizational view provided by the method, device, or machine-readable medium can help detect anomalous behavior that was not detectable by the previous techniques.

The method, device, or machine-readable medium can include operations including obtaining a cloud resource management log that details actions performed by users of cloud resources in a cloud portal. The actions can each include entries comprising at least two of a user identification (ID) of a user of the users, an operation of operations performed on the cloud resource, a uniform resource identifier (URI) of a cloud resource of the cloud resources that is a target of the operation, or a time the operation was performed. The operations can include determining a respective score for each action in the cloud resource management log. The operations can include comparing the respective score to a specified criterion. The operations can include providing an indication of anomalous action in response to determining the respective score satisfies the specified criterion.

Determining the score can include using collaborative filtering. Determining the respective score can include combining a collaborative filtering score for at least two of (i) the user ID and the operation, (ii) the user ID and the resource, (iii) the operation and the resource, or (iv) the user ID and the time.

The operations can further include generating a bipartite graph including (i) respective users of the users and respective cloud resources of the cloud resources as nodes and respective edges representing whether the respective user accessed the respective cloud resource; (ii) respective users of the users and respective operations of the operations as nodes and respective edges representing whether the respective user performed the respective operation; or (iii) respective operations of the operations and respective cloud resources of the cloud resources as nodes and respective edges representing whether the respective operation was performed on the respective cloud resource and wherein collaborative filtering is performed based on data representing the generated graph. The operations can further include, before determining the respective score, filtering the cloud resource management log to include only operations that are performed by an attacker and wherein the respective score is determined based on the filtered cloud resource management log. The operations performed by the attacker include running a command, installing a custom script, changing firewall rules, listing keys, adding users, or changing permissions. Providing the indication of anomalous action can include providing an electronic mail, a pop-up message, or a text message indicating the action of the management log corresponding to the anomalous action.

DETAILED DESCRIPTION

Figure 1:
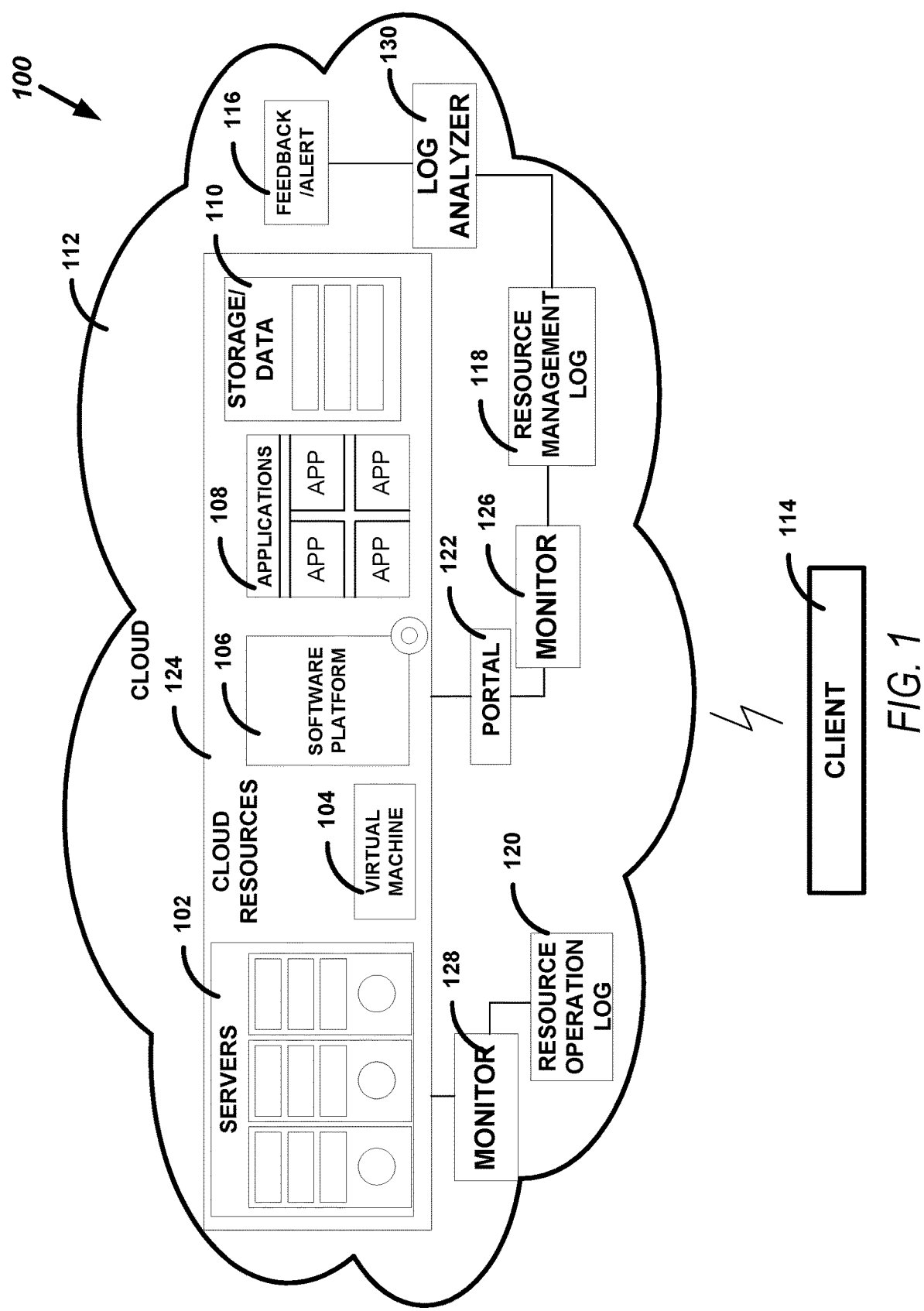
FIG. 1 illustrates, by way of example, a diagram of an embodiment of a cloud service system.

In the following description, reference is made to the accompanying drawings that form a part hereof, and in which is shown by way of illustration specific embodiments which may be practiced. These embodiments are described in sufficient detail to enable those skilled in the art to practice the embodiments. It is to be understood that other embodiments may be utilized and that structural, logical, and/or electrical changes may be made without departing from the scope of the embodiments. The following description of embodiments is, therefore, not to be taken in a limited sense, and the scope of the embodiments is defined by the appended claims.

Cloud users often deploy multiple cloud resources to form a system of cloud resources or otherwise access resources for their purposes. These systems are vulnerable to attacks of a variety of attack types. To help mitigate security risks, cloud providers, such as Microsoft Corporation of Redmond, Wash., United States, as well as other third-party security solution vendors, offer attack detection systems. These attack detection systems provide a user with one or more alerts in response to detecting an attack on a cloud resource to which the cloud customer (e.g., user or organization) has access.

Many cyber security solutions focus on protecting an endpoint or computer resource from attacks. Not all attacks can be detected with a focus on endpoint protection. Endpoint protection can help protect a single resource attack by monitoring operations of the resource. Embodiments provide improvements that examine operations performed on the resources as opposed to operations performed by the resources. Operations performed by the resources are dependent on the type of resource. For example, a cloud resource can run an app, the operations of that cloud resource are the operations of the app. A cloud resource can include a database, for such a resource the operations are storing or providing data. Operations performed on a resource include resource configuration, policy management, deployment, or the like. In general, operations performed by the resource can be monitored using a resource monitor and operations performed on the resource can be monitored using a portal monitor. Embodiments can surface security related anomalies detectable by analysis of resource management logs. Embodiments can find access anomalies through analysis of cloud resource management logs (e.g., Azure Resource Management (ARM) logs). In ARM logs, each organization is associated with its own column of entries.

Embodiments can use machine learning (ML) to analyze operations performed on cloud resources. Cloud resource management log monitoring can help identify an anomalous action performed by analyzing an organization as a whole. This is distinct from monitoring an individual user or operation by a resource. Operations performed on cloud resources of an organization can be monitored across users to determine whether an operation by a user from a cloud portal and on a cloud resource is anomalous.

As cloud systems grow more complex, attacks become more sophisticated as well. Such attacks may use phishing to gain access to an account and use that account for reconnaissance (e.g., gathering info about the system architecture, network details, etc.). Once access to a user account is obtained, an attacker can target a specific user account that has access to data the attacker needs, hence this user can be targeted specifically. An attacker can then gain access to the data desired and performing the exfiltration. This is just one example of an attack and many others are possible. This type of attack is not detected by prior endpoint or individual user monitoring solutions because the actions performed are not monitored at level required to detect these types of attacks. For example, consider a distributed attack in which a group of users launch a large number of virtual machines (VMs) and running code on each of the VMs. From the perspective of the individual user, the action of launching a few VMs is not suspicious activity and from the perspective of each VM, their launch is not suspicious. However, from the viewpoint of the group of users (organization), the actions are suspicious. The Embodiments herein can help detect such an attack by analyzing actions detailed in a cloud resource management log.

FIG. 1 illustrates, by way of example, a diagram of an embodiment of a cloud service system 100. The cloud service system 100 can provide cloud computing services to various computing systems such as desktops, laptops, tablets, smartphones, embedded computers, point-of-sale terminals, and so on. The cloud service system 100 can include cloud resources that includes for example, servers and storage devices as well as various software products such as operating systems, databases, and applications.

Rather than maintaining their own data centers, many enterprises (cloud customers) subscribe as customers of a database service of the cloud service system 100 to store and process their data. For example, a retail company can subscribe to a database service to store records of the sales transactions of the company and use an interface provided by the database service to run queries to help in analyzing the sales data. As another example, a utility company can subscribe to a database service for storing meter readings collected from the meters of its customers. As yet another example, a government entity can subscribe to a database service for storing and analyzing tax return data of millions of taxpayers.

Enterprises that subscribe to the cloud service system 100 want data privacy and security assurances. Although the cloud service system 100 can employ many techniques to help preserve the privacy of customer data, parties seeking to steal such customer data are continually devising new techniques to access the data.

The cloud infrastructure 112 is a network of servers and other computer resources that are accessible through the Internet and provides a variety of hardware and software services. These resources are designed to either store and manage data (e.g., storage/data 110), run applications 108, or deliver content or a service (e.g., through servers 102). Services can include streaming videos, web mail, office productivity software, or social media, among others. Instead of accessing files and data from a local or personal computer, cloud data is accessed online from an Internet-capable device, such as client 114.

The system 100 as illustrated includes a cloud infrastructure 112 and a client 114. The cloud infrastructure 112 includes computing resources 124 which the client 114 can access for their own computing needs. The computer devices as illustrated include servers 102, virtual machines 104, software platform 106, applications 108, storage/data 110, portal 122, and feedback/alerts 116.

A user of the client 114 can access resources 124 of the cloud infrastructure 112. To access the resources 124, the user can log into a portal 122. Logging into the portal 122 can include providing a username, password, two-factor authentication, or the like. The user can then generate one or more cloud resources 124, move one or more cloud resources 124, connect one or more cloud resources 124 to each other, alter an access or security policy for one or more cloud resources 124, or the like.

As the user performs tasks in the portal 122, a monitor 126 can generate entries in a resource management log 118. The monitor 126 can include software, hardware, firmware, or a combination thereof. The entries in the resource management log 118 can include at least some of the following information: (i) a user identification (ID) that uniquely identifies the user that was logged in to the portal 122 to perform a management operation on the cloud resources 124, (ii) a resource ID that uniquely identifies the cloud resource 124 that is a target of an operation performed by the user associated with the user ID (e.g., a uniform resource identifier (URI) or the like), (iii) an operation performed by the user associated with the user ID and on the resource associated with the resource ID, or (iv) a time at which the user associated with the user ID performed the operation on the resource associated with the resource ID. The entries can be organized in a table such that entries across a row or column can correspond to a same event, called an "action" herein. An example resource management log is provided:

TABLE 1

Example Resource Management Log

| User ID | ResourceID | Operation | Time | Day |
| --- | --- | --- | --- | --- |
| Newton | Database1 | Connect server to VM | 17:59 | Weds |
| Maxwell | Server8 | Install app | 9:17 | Mon |
| Bohr | Database4 | Create | 1:17 | Sat |

Table 1 is simplified to aid in understanding of the subject matter described. Typically, the resource management log 118 includes more than 3 actions. The resource management log 118 includes all operations performed from the portal 122 on the cloud resources 124. With hundreds of users, the resource management log 118 can get quite large.

The resource management log 118 is distinct from a resource operation log 120. The resource operation log 120 regards operations by the cloud resources 124 while the resource management log 118 details operations for management of the cloud resources 124 (sometimes called operations performed on the resources). The resource operation log 120 records operations of the cloud resource 124 (e.g., memory reads, memory writes, app to app communications, application execution, or the like). The resource management log 118 records operations performed in the portal 122 initiated by a user (e.g., database 110 generation, connecting cloud resources 124, deploying an app 108, deleting or generating a virtual machine 104, or the like). Operations performed in the portal 122 are operations on the cloud resource 124. This distinction is important because typical security, like a security measure provided based on the resource operation log 120, provides endpoint protection. In the example of cloud systems, such as the system 100, the endpoint is the cloud resource 124. The security measures provided by endpoint protection can be different from the security measures provided based on the resource management log 118. The endpoint protection detects whether a particular cloud resource 124 is attacked. The security measures provided based on the resource management log 118 can include security for types of attacks that are not detectable based on the resource operation log 120. For example, the security measures provided based on the resource management log 118 can include phishing-based or other exfiltration of data, or other attack that is staged across multiple cloud resources 124.

Consider a scenario in which an attacker has received login information for a user, such as through phishing. That attacker can then login to the portal 122 and deploy a mechanism to perform reconnaissance and gather information about the structure of the cloud resources 124 deployed. The attacker can then target a specific user that has access to data the attacker desires. It is not possible to identify such an attack using the resource operation log 120. However, such an attack can be identified using the resource management log 118 because the resource management log 118 takes a more holistic view of the cloud resources, namely an organizational level that monitors all activity with the cloud resources 124 across the organization.

The servers 102 can provide results as a result of a request for computation. The server 102 can be a file server that provides a file in response to a request for a file, a web server that provides a web page in response to a request for website access, an electronic mail server (email server) that provides contents of an email in response to a request, a login server that provides an indication of whether a username, password, or other authentication data are proper in response to a verification request.

The virtual machine (VM) 104 is an emulation of a computer system. The VM 104 provides the functionality of a physical computer. VMs can include system VMs that provide the functionality to execute an entire operating system (OS) or process VMs that execute a computer application in an isolated, platform-independent environment. VMs can be more secure than a physical computer as an attack on the VM is merely an attack on an emulation. VMs can provide functionality of first platform (e.g., Linux, Windows, or another OS) on a second, different platform.

The software platform 106 is an environment in which a piece of software is executed. The software platform 106 can include hardware, OS, a web browser and associated application programming interfaces (APIs), or the like. The software platform 106 can provide tools for developing more computer resources, such as software. The software platform 106 can provide low-level functionality for a software developer.

The applications 108 can be accessible through one of the servers 102, the VM 104, a container (see FIG. 3), or the like. The applications 108 provide compute resources to a user such that the user does not have to download or execute the application on their own computer. The applications 108, for example, can include a machine learning (ML) suite that provides configured or configurable ML software. The ML software can include artificial intelligence type software, such as a neural network (NN) or other technique. The ML or AI techniques can have memory or processor bandwidth requirements that are prohibitively expensive or complicated for some cloud customers to implement or support.

The storage/data 110 can include one or more databases, containers, or the like for? memory access. The storage/data 110 can be partitioned such that a given user has dedicated memory space. A service level agreement (SLA) generally defines an amount of uptime, downtime, maximum or minimum lag in accessing the data, or the like.

The client 114 is a compute device capable of accessing the functionality of the cloud infrastructure 112. The client 114 can include a smart phone, tablet, laptop, desktop, a server, television or other smart appliance, a vehicle (e.g., a manned or unmanned vehicle), or the like. The client 114 accesses the resources provided by the cloud infrastructure 112. Each request from the client 114 can be associated with an internet protocol (IP) address identifying the client 114, a username identifying a user of the device, a customer identification indicating an entity that has permission to access the cloud infrastructure 112, or the like.

The alert 116 can be provided to the client 114 responsive to a resource management log anomaly detection. The anomaly in the resource management log can be determined using a log analyzer 130. The alert 116 can include a pop-up window, text message, email, or the like. The alert 116 can include information that lead to production of the alert 116 or a link that, when selected, navigates a user to the information that lead to production of the alert 116.

The log analyzer 130 can include software, firmware, or hardware configured to perform operations of resource management log 118 analysis. The log analyzer 130 can receive or access the resource management log 118. The log analyzer 130 can determine whether an anomaly is present in the resource management log 118. An anomaly can indicate an attack, such as cannot be detected based on the resource operation log 120. An anomaly in this context is an action, or related entries, that is determined be an unexpected cloud resource management operation. The log analyzer 130 can find the one or more unexpected actions of the user in the portal 122 by analyzing the resource management log 118 (e.g., and only the resource management log 118). The log analyzer 130 is described in more detail in FIG. 2.

The cloud infrastructure 112 is accessible by any client 114 with sufficient permission. Usually a customer will pay for or otherwise gain permission to access the cloud infrastructure 112 using one or more devices. Since multiple services and multiple clients 114 with different habits can access the cloud infrastructure 112, it is difficult to provide a "one size fits all" security solution. Typically, an attack on the server 102 is different than an attack on the VM 104, which is different than an attack on a container, etc. These different attack vectors are usually handled by instantiating different security techniques with monitoring at each device, such as by the monitor 128. Also, these attack vectors can be related, as an attack on a container can be triggered by an impersonation attack, which can be detected by identifying an increase in failed login attempts or abnormal usage of a resource of the cloud infrastructure 112 (relative to the user permitted to access).

Figure 2:
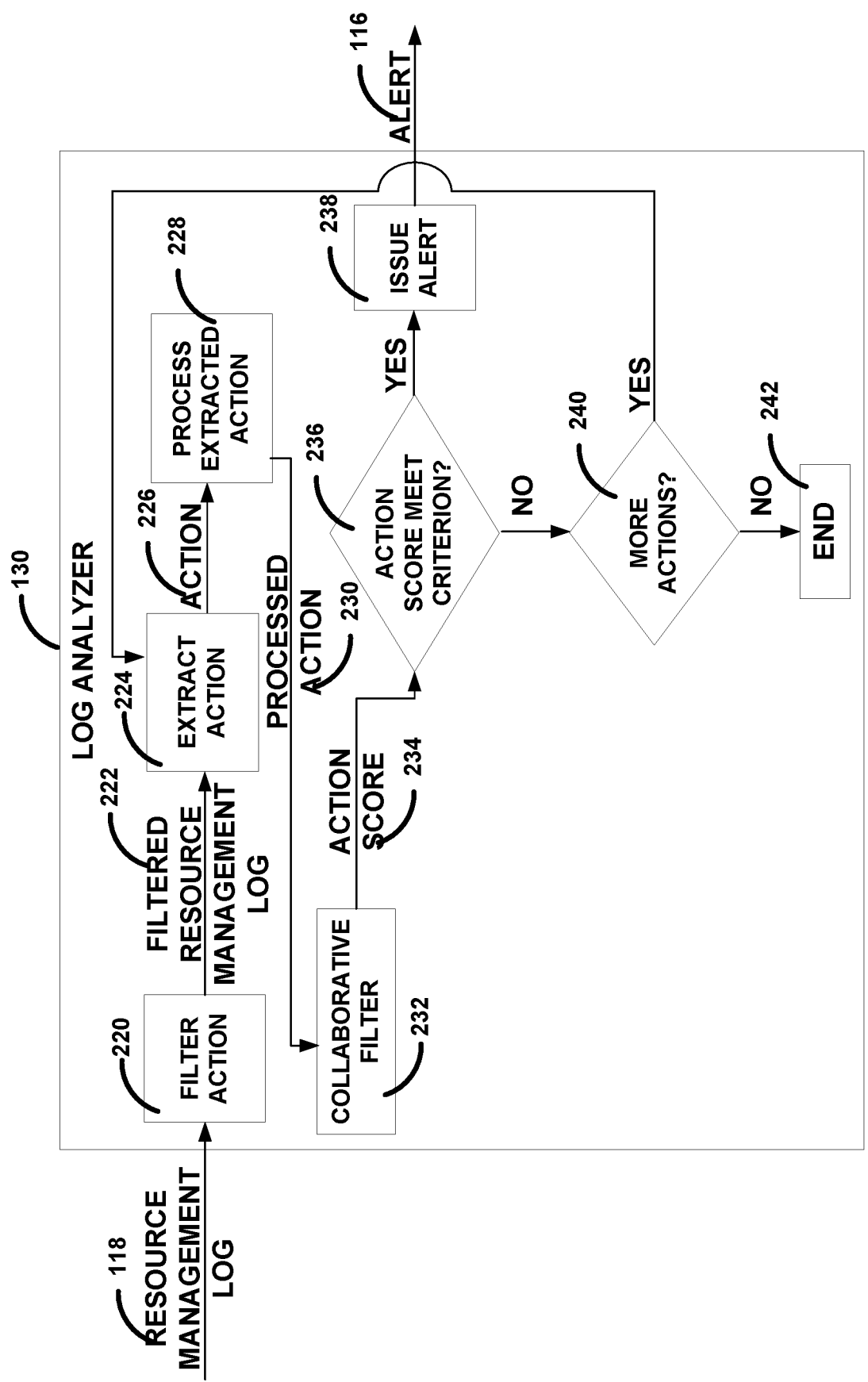
FIG. 2 illustrates, by way of example, a diagram of an embodiment of the log analyzer of FIG. 1.

FIG. 2 illustrates, by way of example, a diagram of an embodiment of operations of the log analyzer 130. The log analyzer 130 can receive the cloud resource management log 118 as input and provide an alert 116 as output (if the alert 116 is warranted). The cloud resource management log 118 can be filtered at operation 220. The result of the operation 220 is a filtered cloud resource management log 222. The filter action operation 220 can remove an action from the resource management log 222 that is not associated with a potential attack. For example, a user that provides documentation on how to use a cloud resource 124 (see FIG. 1) or how the cloud resource 124 functions is not part of an attack, a user that enables a protection mechanism (e.g., antimalware, firewall, or the like) for a first time can be considered to be not part of an attack, among others. The filter action operation 220 can remove such actions from the resource management log 118. The result is a filtered resource management log 222 that includes actions 226 that, potentially, relate to an attack. Common actions that are performed by an attacker include running a command, installing a custom script, changing firewall rules, listing keys, adding users, changing permissions, or the like.

At operation 224, an action 226 can be extracted from the filtered resource management log 222. The action 226 is multiple entries that are each associated with a specific instance of an operation performed by a user. For example, in Table 1, an action is a single row of entries. Each row of entries in Table 1 correspond to a single instance of an operation monitored while the user was using the portal 122.

At operation 228 the extracted action 226 is processed. Consider the generalized action {userID, resourceID, operation, time, day of week}. The operation 228 can include splitting the generalized action into one or more pairs of entries. Pairs of entries for the example generalized action include (userID, resourceID), (userID, operation), (resourceID, operation), (userID, time), and (userID, day of week). The processed action 230 can include one or more pairs of the entries. The pair of entries can be provided to a collaborative filter 232.

Figure 3:
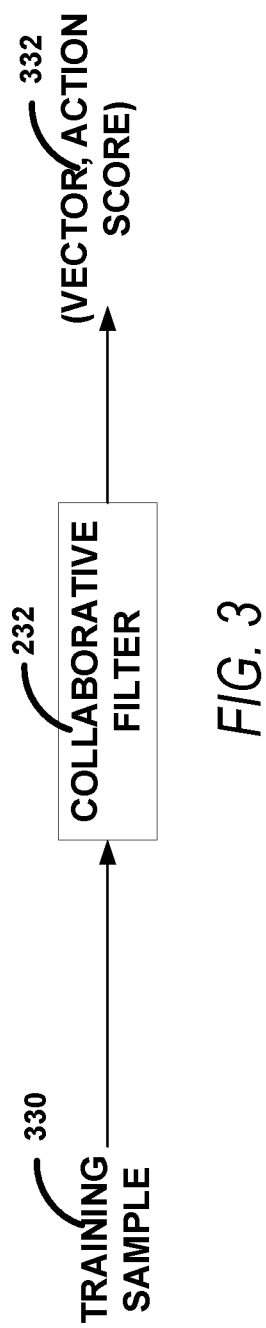
FIG. 3 illustrates, by way of example, a conceptual block diagram of training the collaborative filter of FIG. 2.

The operation 228 can include generating a graph based on the pairs of entries. The graph can include a bipartite graph in some embodiments. The bipartite graph can include nodes connected by edges. The nodes can represent respective entries in the pair of entries. An edge connecting nodes indicates that the nodes on each side of the edge are related in the graph. The graph can grow as more actions 226 are processed at operation 228. The processed action 230 can include a representation of the graph. FIG. 3 shows an example of a bipartite graph.

The collaborative filter 232 can generate an action score 234 for each entry pair. The score 234 indicates whether the action 226 of the user is consistent with users that perform similar actions as the user. The output of the collaborative filter 232 can include the action score 234. The collaborative filter 232 can separate the entry into multiple pairs and determine a score for each pair. The scores corresponding to an action can be combined (e.g., summed, weighted and summed, or the like) to generate a final score, the action score 234.

During training, the collaborative filter 232 can compute a latent feature vector per entity. During evaluation the preliminary score can be calculated by performing a dot product between the two relevant vectors. In the final score this preliminary score can be normalized to have a mean of zero and a standard deviation of 1 and multiplied by −1 so that it represents an anomaly score rather than a predicted score.

Collaborative filtering, in a typical use case, is a method of making predictions (filtering) about the interests of the user by collecting preferences or taste information from many users (collaborating). The underlying assumption of the collaborative filtering approach is that if a person A has the same opinion as a person B on an issue, A is more likely to have a same opinion as B on a different issue than that of a randomly chosen person. For example, a collaborative filtering recommendation system for preferences in television programming could make predictions about which television show a user should like given a partial list of that user's tastes (likes or dislikes). Note that these predictions are specific to the user, but use information gleaned from many users.

In the context of cloud security, the operations implemented by the collaborative filter 232 include a method of making predictions (filtering) about the actions of the user by collecting actions from many users (collaborating) (e.g., users within a same or similar organization). The underlying assumption of the collaborative filtering approach is that if a person A performs the same actions as a person B on the cloud resources 124, A is more likely to perform B's actions on a different cloud resource than that of a randomly chosen person. The score 234 is thus an indication of the likelihood that the action performed by the user is anomalous or not. An anomalous action is more likely associated with an attack than other actions.

At operation 236, the action score 234 can be compared to a criterion. The criterion can be determined using empirical data. A developer or other personnel can set the criterion, test the collaborative filter 232 with actions 226 that are anomalous and non-anomalous, record the accuracy of the collaborative filter 232, and repeat. The criterion corresponding to the best test accuracy of the collaborative filter 232 or that provides sufficient collaborative filter 232 accuracy can be chosen as the criterion. Example criterion include one or more thresholds on individual pair scores, a threshold on the sum of individual pair scores, or the like.

If, at operation 236, the action score 234 satisfies the criterion, an alert can be issued at operation 238. The alert 116 can provide security personnel with information indicating why the alert 116 was generated. The information can include the action 226 of the filtered resource management log 222 that is deemed anomalous, a portion of the action 226, the action score 234, one or more actions in the filtered resource management log 222 or the resource management log 118 that are associated with the same user ID as the action 226 (e.g., one or more actions associated with the user ID that are immediately before or immediately after the action 226 in terms of time).

A normalized score can have a criterion specified in terms of number of standard deviations from the mean. A user can adjust the standard deviation to manage false positives and true positives. A lower standard deviation can result in more false positives, while a higher standard deviation can result in fewer true positives being detected.

The alert 116 can include a text description explaining why the alert was generated. For an anomalous credential access, for example, the alert 116 can indicate the anomaly relates to a user accessing a resource they do not usually access. This operation might indicate that an account in the organization was breached, and that the threat actor is trying to retrieve the credentials to access one of the cloud resources 124. Alternatively, the operation might have been performed by a legitimate user in your organization. For a different anomalous credential access, the text can indicate that an account in the organization was breached, and that the threat actor is trying to retrieve the credentials to access one of the cloud resources 124. Alternatively, the operation might have been performed by a legitimate user in the organization. For an example that includes anomalous detection of code, the alert 116 can indicate that the anomaly relates to a user performing an operation at an unusual time. The alert 116 might indicate that an account in the organization was breached, and that the threat actor is trying to execute code on one of the cloud resources 124 in the environment. Alternatively, it might have been performed by a legitimate user in the organization. In general, the text of the alert 116 can change based on the pairs of scores that were determined to indicate an anomaly.

If, at operation 236, the action score 234 does not satisfy the criterion, operation 240 can be performed. The operation 240 can include determining if more actions in the filtered resource management log 222 are to be processed. If at least one more action 226 is to be processed, the log analyzer 130 can perform operation 224. If no more actions 226 are to be processed, the operations of the log analyzer 130 can terminate at operation 242.

FIG. 3 illustrates, by way of example, a conceptual block diagram of training the collaborative filter 232. Training samples 330 can be provided as input to the collaborative filter 232. The training samples 330 can include actions similar to the processed actions 230 along with a label indicating whether the training sample 330 corresponds to anomalous or normal behavior. The collaborative filter 232 can, based on the training samples 330, generate a (vector, action score) pair 332. The vector is an encoding of the training sample 330 and the action score is similar to the action score 234. Then, during operation, the collaborative filter can use the generated (vector, action score) pair 332 to determine the action score 234.

Figure 4:
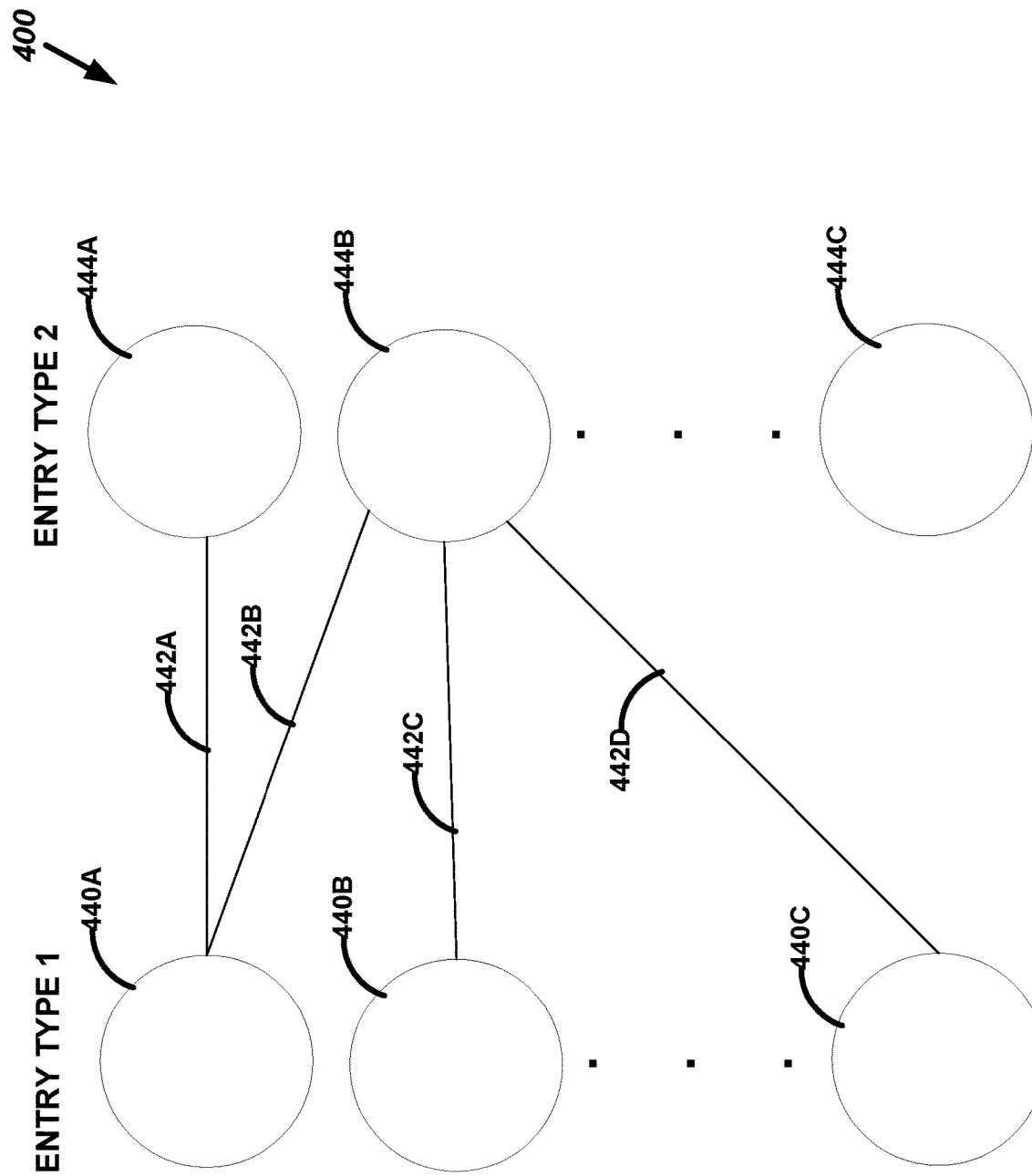
FIG. 4 illustrates, by way of example, a conceptual block diagram of a bipartite graph.

FIG. 4 illustrates, by way of example, a conceptual block diagram of a bipartite graph 400. The graph 400 can be generated at operation 228 (see FIG. 2). The graph 400 as illustrated includes nodes 440A, 440B, 440C connected by one or more edges 442A, 442B, 442C, 442D to second nodes 444A, 444B, 444C.

Each of the first nodes 440A-440C represents a specific instance of an entry type of the resource management log 222 and each of the second nodes 444A-444C represents a specific instance of another entry type. Example entry types include user ID, cloud resource URI, operation, time, day of the week, among others. Each node 440A-440C, 442A-442C represents a specific instance of the entry type. Each specific instance can be represented by a single node. If entry type 1 is user ID, then each node 442A-442C can represent a specific user ID. An edge 442A-442D between two nodes 440A-440C indicates that an action 226 (see FIG. 2) in the cloud resource management log 118 includes both nodes as separate entries.

A representation of one or graphs like the bipartite graph 400 can be used by the collaborative filter 232 to determine the action score 234. The collaborative filter 232 can, provided a new input pair, such as (user ID, cloud resource URI), (user ID, operation), (cloud resource URI, operation), (user ID, time) and based on the representation of the graph, determine the action score 234, or a portion of the action score 234 in cases where multiple input pairs are used to the determine the action score 234

Figure 5:
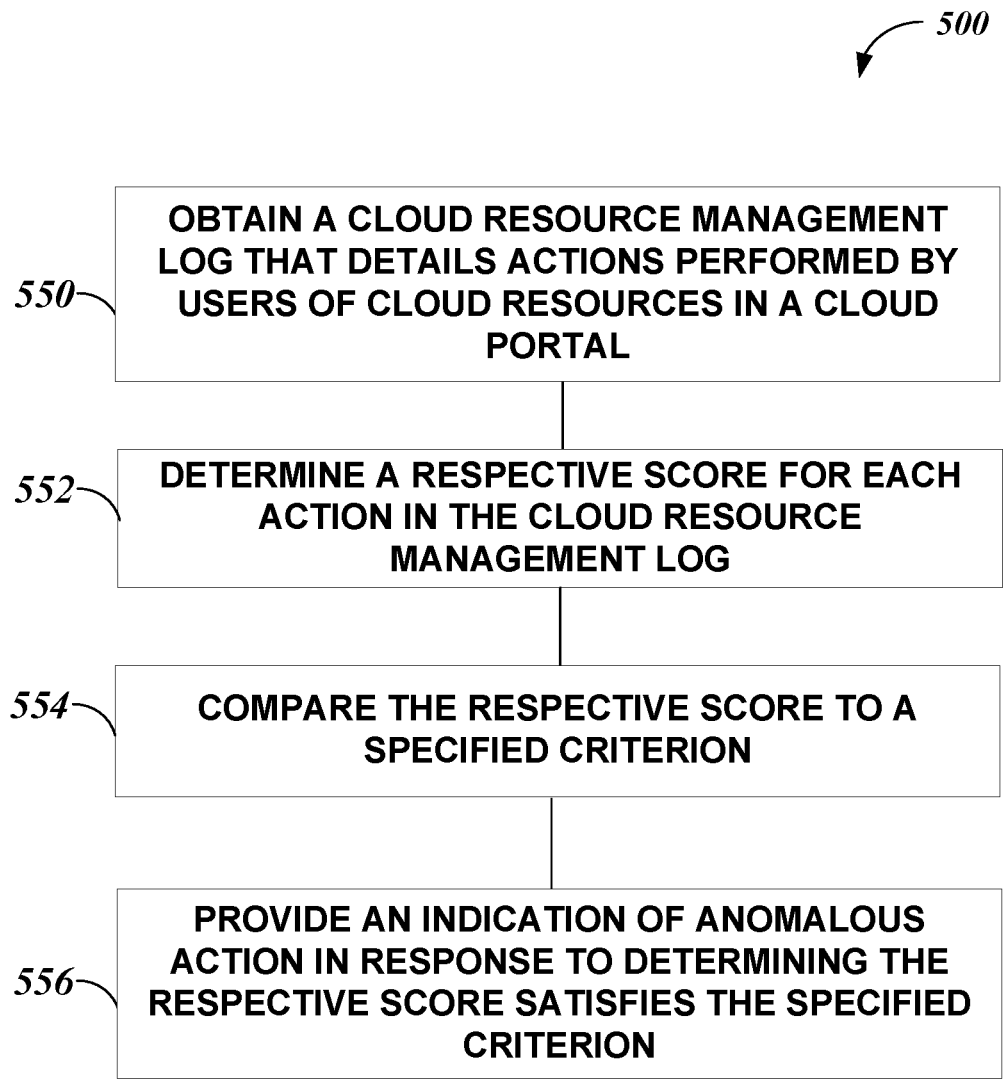
FIG. 5 illustrates, by way of example, a block diagram of an embodiment of a method for cloud resource security.

FIG. 5 illustrates, by way of example, a block diagram of an embodiment of a method 500 for cloud resource security management. The method 500 as illustrated includes obtaining a cloud resource management log that details actions performed by users of cloud resources in a cloud portal, at operation 550; determining a respective score for each action in the cloud resource management log, at operation 552; comparing the respective score to a specified criterion, at operation 554; and providing an indication of anomalous action in response to determining the respective score satisfies the specified criterion, at operation 556. The actions can each include entries comprising at least two of a user identification (ID) of a user of the users, an operation of operations performed on the cloud resource, a uniform resource identifier (URI) of a cloud resource of the cloud resources that is a target of the operation, or a time the operation was performed.

The operation 552 can include determining the score includes using collaborative filtering. The operation 552 can include combining a collaborative filtering score for at least two of (i) the user ID and the operation, (ii) the user ID and the resource, (iii) the operation and the resource, or (iv) the user ID and the time.

The method 500 can further include generating a bipartite graph including (i) respective users of the users and respective cloud resources of the cloud resources as nodes and respective edges representing whether the respective user accessed the respective cloud resource; (ii) respective users of the users and respective operations of the operations as nodes and respective edges representing whether the respective user performed the respective operation; or (iii) respective operations of the operations and respective cloud resources of the cloud resources as nodes and respective edges representing whether the respective operation was performed on the respective cloud resource and wherein collaborative filtering is performed based on data representing the generated graph.

The method 500 can further include, before performing operation 552, filtering the cloud resource management log to include only operations that are performed by an attacker and wherein the respective score is determined based on the filtered cloud resource management log. The method 500 can further include wherein, the operations performed by the attacker include running a command, installing a custom script, changing firewall rules, listing keys, adding users, or changing permissions. The method 500 can further include, wherein providing the indication of anomalous action includes providing an electronic mail, a pop-up message, or a text message indicating the action of the management log corresponding to the anomalous action.

Figure 6:
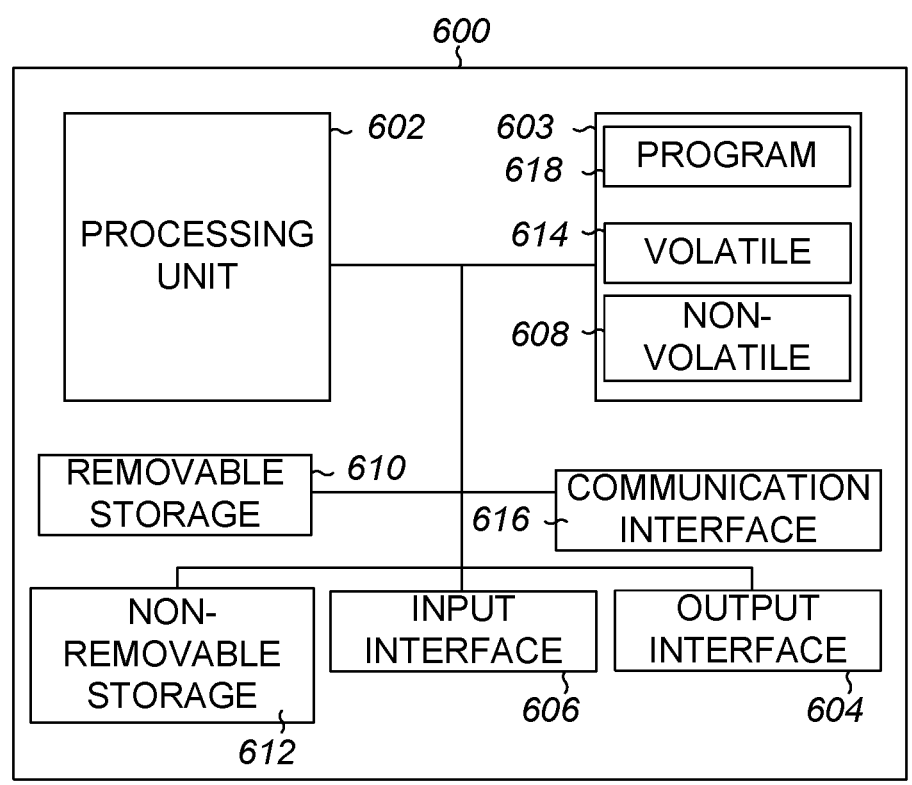
FIG. 6 illustrates, by way of example, a block diagram of an embodiment of a machine (e.g., a computer system) to implement one or more embodiments.

FIG. 6 illustrates, by way of example, a block diagram of an embodiment of a machine 600 (e.g., a computer system) to implement one or more embodiments. The machine 600 can implement a technique for improved cloud resource security. The client 111, cloud infrastructure 112, cloud resource 124, monitor 126, 128, log analyzer 130, or a component thereof can include one or more of the components of the machine 600. One or more of the client 111, cloud infrastructure 112, cloud resource 124, monitor 126, 128, log analyzer 130, monitor 200, method 500, or a component or operations thereof can be implemented, at least in part, using a component of the machine 600. One example machine 600 (in the form of a computer), may include a processing unit 602, memory 603, removable storage 610, and non-removable storage 612. Although the example computing device is illustrated and described as machine 600, the computing device may be in different forms in different embodiments. For example, the computing device may instead be a smartphone, a tablet, smartwatch, or other computing device including the same or similar elements as illustrated and described regarding FIG. 6. Devices such as smartphones, tablets, and smartwatches are generally collectively referred to as mobile devices. Further, although the various data storage elements are illustrated as part of the machine 600, the storage may also or alternatively include cloud-based storage accessible via a network, such as the Internet.

Memory 603 may include volatile memory 614 and non-volatile memory 608. The machine 600 may include—or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 600 may include or have access to a computing environment that includes input 606, output 604, and a communication connection 616. Output 604 may include a display device, such as a touchscreen, that also may serve as an input device. The input 606 may include one or more of a touchscreen, touchpad, mouse, keyboard, camera, one or more device-specific buttons, one or more sensors integrated within or coupled via wired or wireless data connections to the machine 600, and other input devices. The computer may operate in a networked environment using a communication connection to connect to one or more remote computers, such as database servers, including cloud-based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 602 (sometimes called processing circuitry) of the machine 600. A hard drive, CD-ROM, and RAM are some examples of articles including a non-transitory computer-readable medium such as a storage device. For example, a computer program 618 may be used to cause processing unit 602 to perform one or more methods or algorithms described herein.

The operations, functions, or algorithms described herein may be implemented in software in some embodiments. The software may include computer executable instructions stored on computer or other machine-readable media or storage device, such as one or more non-transitory memories (e.g., a non-transitory machine-readable medium) or other type of hardware based storage devices, either local or networked. Further, such functions may correspond to subsystems, which may be software, hardware, firmware, or a combination thereof. Multiple functions may be performed in one or more subsystems as desired, and the embodiments described are merely examples. The software may be executed on a digital signal processor, ASIC, microprocessor, central processing unit (CPU), graphics processing unit (GPU), field programmable gate array (FPGA), or other type of processor operating on a computer system, such as a personal computer, server or other computer system, turning such computer system into a specifically programmed machine. The functions or algorithms may be implemented using processing circuitry, such as may include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, field programmable gate arrays (FPGAs), or the like).

Additional Notes and Examples

Example 1 can include a method for cloud resource security management, the method comprising obtaining a cloud resource management log that details actions performed by users of cloud resources in a cloud portal, the actions including entries comprising at least two of a user identification (ID) of a user of the users, an operation of operations performed on the cloud resource, a uniform resource identifier (URI) of a cloud resource of the cloud resources that is a target of the operation, or a time the operation was performed, determining a respective score for each action in the cloud resource management log, comparing the respective score to a specified criterion, and providing an indication of anomalous action in response to determining the respective score satisfies the specified criterion.

In Example 2, Example 1 can further include, wherein determining the score includes using collaborative filtering.

In Example 3, Example 2 can further include, wherein determining the respective score includes combining a collaborative filtering score for at least two of (i) the user ID and the operation, (ii) the user ID and the resource, (iii) the operation and the resource, or (iv) the user ID and the time.

In Example 4, Example 3 can further include generating a bipartite graph including (i) respective users of the users and respective cloud resources of the cloud resources as nodes and respective edges representing whether the respective user accessed the respective cloud resource; (ii) respective users of the users and respective operations of the operations as nodes and respective edges representing whether the respective user performed the respective operation; or (iii) respective operations of the operations and respective cloud resources of the cloud resources as nodes and respective edges representing whether the respective operation was performed on the respective cloud resource and wherein collaborative filtering is performed based on data representing the generated graph.

In Example 5, at least one of Examples 1-4 can further include, before determining the respective score, filtering the cloud resource management log to include only operations that are performed by an attacker and wherein the respective score is determined based on the filtered cloud resource management log.

In Example 6, Example 5 can further include wherein, the operations performed by the attacker include running a command, installing a custom script, changing firewall rules, listing keys, adding users, or changing permissions.

In Example 7, at least one of Examples 1-6 can further include, wherein providing the indication of anomalous action includes providing an electronic mail, a pop-up message, or a text message indicating the action of the management log corresponding to the anomalous action.

Example 8 can include a device for performing the method of at least one of Examples 1-7.

Example 9 can include a non-transitory machine-readable medium including instructions that, when executed by a machine, cause the machine to perform operations comprising the method of at least one of Examples 1-7.

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A method for cloud resource security management, the method comprising:
   obtaining a cloud resource management log that details actions performed by a group of users on cloud resources through accessing a cloud portal through which the group of users logs in and alters connections between and a security policy of the cloud resources, the actions each including entries comprising a user identification (ID) of a user of the group of users, an operation of operations performed on a cloud resource of the cloud resources, and (i) a uniform resource identifier (URI) of a cloud resource of the cloud resources that is a target of the operation, or (ii) a time the operation was performed, the operations including two or more of (i) generating one or more cloud resources, (ii) moving one or more cloud resources, (iii) connecting one or more cloud resources to each other, or (iv) altering an access or security policy for one or more cloud resources;
   determining a respective score for each action in the cloud resource management log;
   comparing the respective score to a specified criterion; and
   providing an indication of anomalous action in response to determining the respective score satisfies the specified criterion.

2. The method of claim 1, wherein determining the score includes using collaborative filtering.

3. The method of claim 2, wherein determining the respective score includes combining a collaborative filtering score for at least two of (i) the user ID and the operation, (ii) the user ID and the resource, (iii) the operation and the resource, or (iv) the user ID and the time.

4. The method of claim 3, further comprising generating a bipartite graph including (i) respective users of the group of users and respective cloud resources of the cloud resources as nodes and respective edges representing whether the respective user accessed the respective cloud resource, (ii) respective users of the group of users and respective operations of the operations as nodes and respective edges representing whether the respective user performed the respective operation; or (iii) respective operations of the operations and respective cloud resources of the cloud resources as nodes and respective edges representing whether the respective operation was performed on the respective cloud resource and wherein collaborative filtering is performed based on data representing the generated graph.

5. The method of claim 1, further comprising, before determining the respective score, filtering the cloud resource management log to include only operations that are performed by an attacker and wherein the respective score is determined based on the filtered cloud resource management log.

6. The method of claim 5, the operations performed by the attacker include running a command, installing a custom script, changing firewall rules, listing keys, adding users, or changing permissions.

7. The method of claim 1, wherein providing the indication of anomalous action includes providing an electronic mail, a pop-up message, or a text message indicating the action of the management log corresponding to the anomalous action.

8. A compute device comprising:
   processing circuitry;
   a memory coupled to the processing circuitry, the memory including instructions that, when executed by the processing circuitry, cause the processing circuitry to perform operations for cloud resource security management, the operations comprising:
   obtaining a cloud resource management log that details actions performed by a group of users on cloud resources through accessing a cloud portal through which the group of users logs in and alters connections between and a security policy of the cloud resources, the actions including entries comprising a user identification (ID) of a user of the group of users, an operation of operations performed on a cloud resource of the cloud resources, and (i) a uniform resource identifier (URI) of a cloud resource of the cloud resources that is a target of the operation, or (ii) a time the operation was performed, the operations including two or more of (i) generating one or more cloud resources, (ii) moving one or more cloud resources, (iii) connecting one or more cloud resources to each other, or (iv) altering an access or security policy for one or more cloud resources;
   determining a respective score for each action in the cloud resource management log;
   comparing the respective score to a specified criterion; and
   providing an indication of anomalous action in response to determining the respective score satisfies the specified criterion.

9. The device of claim 8, wherein determining the score includes using collaborative filtering.

10. The device of claim 9, wherein determining the respective score includes combining a collaborative filtering score for at least two of (i) the user ID and the operation, (ii) the user ID and the resource, (iii) the operation and the resource, or (iv) the user ID and the time.

11. The device of claim 10, further comprising generating a bipartite graph including (i) respective users of the group of users and respective cloud resources of the cloud resources as nodes and respective edges representing whether the respective user accessed the respective cloud resource; (ii) respective users of the group of users and respective operations of the operations as nodes and respective edges representing whether the respective user performed the respective operation; or (iii) respective operations of the operations and respective cloud resources of the cloud resources as nodes and respective edges representing whether the respective operation was performed on the respective cloud resource and wherein collaborative filtering is performed based on data representing the generated graph.

12. The device of claim 8, further comprising, before determining the respective score,
   filtering the cloud resource management log to include only operations that are performed by an attacker and wherein the respective score is determined based on the filtered cloud resource management log.

13. The device of claim 12, the operations performed by the attacker include running a command, installing a custom script, changing firewall rules, listing keys, adding users, or changing permissions.

14. The device of claim 8, wherein providing the indication of anomalous action includes providing an electronic mail, a pop-up message, or a text message indicating the action of the management log corresponding to the anomalous action.

15. A non-transitory machine-readable medium including instructions that, when executed by a machine, cause the machine to perform operations for cloud resource security management, the operations comprising:

obtaining a cloud resource management log that details actions performed by users of a group of users on cloud resources through accessing a cloud portal through which the group of users logs in and alters connections between and a security policy of the cloud resources, the actions including entries comprising at least two of a user identification (ID) of a user of the group of users, an operation of operations performed on a cloud resource of the cloud resources, and (i) a uniform resource identifier (URI) of a cloud resource of the cloud resources that is a target of the operation, or (ii) a time the operation was performed, the operations including two or more of (i) generating one or more cloud resources, (ii) moving one or more cloud resources, (iii) connecting one or more cloud resources to each other, or (iv) altering an access or security policy for one or more cloud resources;

determining a respective score for each action in the cloud resource management log;

comparing the respective score to a specified criterion; and providing an indication of anomalous action in response to determining the respective score satisfies the specified criterion.

16. The non-transitory machine-readable medium of claim 15, wherein determining the score includes using collaborative filtering.

17. The non-transitory machine-readable medium of claim 16, wherein determining the respective score includes combining a collaborative filtering score for at least two of (i) the user ID and the operation, (ii) the user ID and the resource, (iii) the operation and the resource, or (iv) the user ID and the time.

18. The non-transitory machine-readable medium of claim 17, further comprising generating a bipartite graph including (i) respective users of the group of users and respective cloud resources of the cloud resources as nodes and respective edges representing whether the respective user accessed the respective cloud resource; (ii) respective users of the group of users and respective operations of the operations as nodes and respective edges representing whether the respective user performed the respective operation; or (iii) respective operations of the operations and respective cloud resources of the cloud resources as nodes and respective edges representing whether the respective operation was performed on the respective cloud resource and wherein collaborative filtering is performed based on data representing the generated graph.

19. The non-transitory machine-readable medium of claim 15, further comprising, before determining the respective score, filtering the cloud resource management log to include only operations that are performed by an attacker and wherein the respective score is determined based on the filtered cloud resource management log.

20. The non-transitory machine-readable medium of claim 19, the operations performed by the attacker include running a command, installing a custom script, changing firewall rules, listing keys, adding users, or changing permissions.

* * * * *